Patented Feb. 12, 1935

1,991,189

UNITED STATES PATENT OFFICE 1,991,189

ISOLATION OF MILK CONSTITUENTS

Arthur S. Ambrose, Chicago, Ill., assignor to Kraft-Phenix Cheese Corporation, Chicago, Ill., a corporation of Delaware No Drawing. Application March 13, 1933, Serial No. 660,464

3 Claims. (Cl. 99—11)

The invention will be understood, as to its principal features, by reference to the following example which describes the process as utilized in the production of casein from skim milk.

Example.—To ordinary skim milk of normal strength or composition there is added the product known commercially as locust bean gum powder in the proportion of one pound of locust bean gum powder to each one thousand pounds of milk. This powder is added to the milk at room temperature, or at a temperature slightly lower than room temperature. The locust bean gum powder, if desired, may be added in the form of a solution. In any case, after the same has been added to the milk, the mixture is agitated or stirred vigorously in order to thoroughly incorporate the gum in every part of the mixture.

If desired, instead of using raw skim milk, the milk be formed in other ways, for example, by making a solution (or suspension) of dried or powdered skim milk or buttermilk with water so as to provide a liquid containing not more than about 20% solids. Evaporated or condensed milk may be used.

After the gum has been thoroughly incorporated in the liquid material, the mixture is preferably heated to a pasteurizing temperature of about 150° F., whereupon the conditions are such that the casein will settle to the bottom of the container. It is held at this temperature without agitation for about a half hour or more, during which time the settling proceeds. I find that this period of heating tends to accelerate the process and otherwise to improve the efficiency thereof.

It is also advantageous in some cases to homogenize the mixture. This also brings about a more uniform result and a somewhat more rapid settling, which is an important feature of the process.

After the heating step, the mixture is cooled down to about 40 to 50° F. It is then allowed to stand from one to two hours, or until the casein in suspension has settled completely or substantially completely. The mother liquid is then decanted so as to remove 75 to 80% of the total fluid. An amount of pure water equal in volume to that of the liquid removed, together with a proportionate amount of locust bean gum powder or solution (pre-heated to such degree that the same temperature of 150° will be reached for the total mixture) is then added and the liquid mixture (at 150° F.) is re-agitated. It is then held at that temperature for one or two hours until the casein again settles and, by decantation, from 75 to 80% of the liquid is again removed.

If desired, a filter may be employed after the decanting steps, in order to remove a still further percentage of the mother liquid, or, if desired, a similar additional locust bean gum treatment with water and a subsequent decantation may be again employed.

The product so obtained which is then practically free from all of the milk constituents other than casein, may then be dried in the same manner as milk is dried. In such dry form, it is a saleable article and may be used in various ways, e. g., for pharmaceutical and alimentary purposes.

Casein produced in this manner has certain characteristics which so far as I am advised, have not been present in casein heretofore placed on the market. It is as soluble and in the same condition chemically as in ordinary milk, and free from soda or other bases such as are used in the production of soluble casein from casein made by the so-called acid or rennet processes for making casein from milk. It is very stable chemically as well as physically and not only is it in itself free from objectionable taste or odor, but, when used as an ingredient in other products, does not cause any bad odor or taste to develop in such products. Because it is stable in respect of its colloidal properties, it may be utilized as an ingredient for the purpose of stabilizing other products, ice cream for example.

The settling of the casein appears to be due entirely to the presence of the gum. This is shown by the fact that if pure water free from locust bean gum be added to the settled casein, the casein may again be reconstituted to form a colloidal suspension and behaves just as it does in ordinary milk, having no greater tendency to settle than in the case of ordinary milk.

I have described the invention in connection with locust bean gum. However, although locust bean gum appears to be the most efficient material which I have employed as a settling agent, other gums such as gum tragacanth and, to a limited extent, gum Karaya, have value in this connection and may be employed for the purpose indicated.

Locust bean gum powder, when in the concentration indicated, i. e., $\frac{1}{10}$ of 1% by weight, will give high viscosity in a solution which is heated to 150° F. or more. Furthermore, as seems also to be a desirable property in practicing the invention, the degree of concentration should be such that there is no jelling at normal or room temperature, in spite of the high viscosity at the elevated temperature.

I claim as my invention:

1. The method of extracting casein from animal milk, which consists in mixing with the milk about 1/10 of 1% of locust bean gum powder, raising the temperature of the mixture to about 150° F., allowing the casein to settle, and then removing the supernatant liquor.

2. A process of preparing a concentrated casein having substantially the same chemical and physical properties as the casein of normal milk, which comprises intimately mixing with the milk a minor percentage of locust bean gum, heating the mixture at a temperature below that which modifies the casein in order that the latter will separate as a relatively fine precipitate, and removing the excess of water.

3. The process as defined in claim 2, wherein the material is heated to not more than about 150° F. for the purpose of precipitating the casein.

ARTHUR S. AMBROSE.